United States Patent [19]

Harris

[11] 3,788,448

[45] Jan. 29, 1974

[54] OYSTER HANDLING APPARATUS

[76] Inventor: William H. Harris, Rt. 1, Box 96, Chester, Md. 21619

[22] Filed: Jan. 24, 1973

[21] Appl. No.: 326,287

[52] U.S. Cl. .................. 198/56, 198/37, 198/43, 198/48
[51] Int. Cl. ............................................ B65g 47/19
[58] Field of Search ....... 198/43, 46, 48, 50, 37, 61, 198/56

[56] References Cited
UNITED STATES PATENTS

| | | | |
|---|---|---|---|
| 3,031,066 | 1/1959 | Leach | 198/140 |
| 1,419,946 | 6/1922 | Schaffer | 198/37 |
| 2,381,505 | 8/1945 | Lindholm | 198/37 |
| 2,818,162 | 12/1957 | Musschoot et al. | 198/46 |

Primary Examiner—Evon C. Blunk
Assistant Examiner—Richard K. Thomson

[57] ABSTRACT

A material handling apparatus particularly adapted for the handling of oysters or like shell sea food, whereby the oysters or the like are delivered into a hopper having a discharge located in the bottom wall thereof. An endless conveyor having a plurality of buckets suspended therefrom travels in a closed path and when a bucket which is empty of oysters passes under the bottom discharge of the hopper, a flow of oysters is directed into the bucket. On the other hand, if the bucket is already filled with oysters, the same continues on its path without receiving any additional oysters from the bottom discharge of the hopper.

5 Claims, 8 Drawing Figures

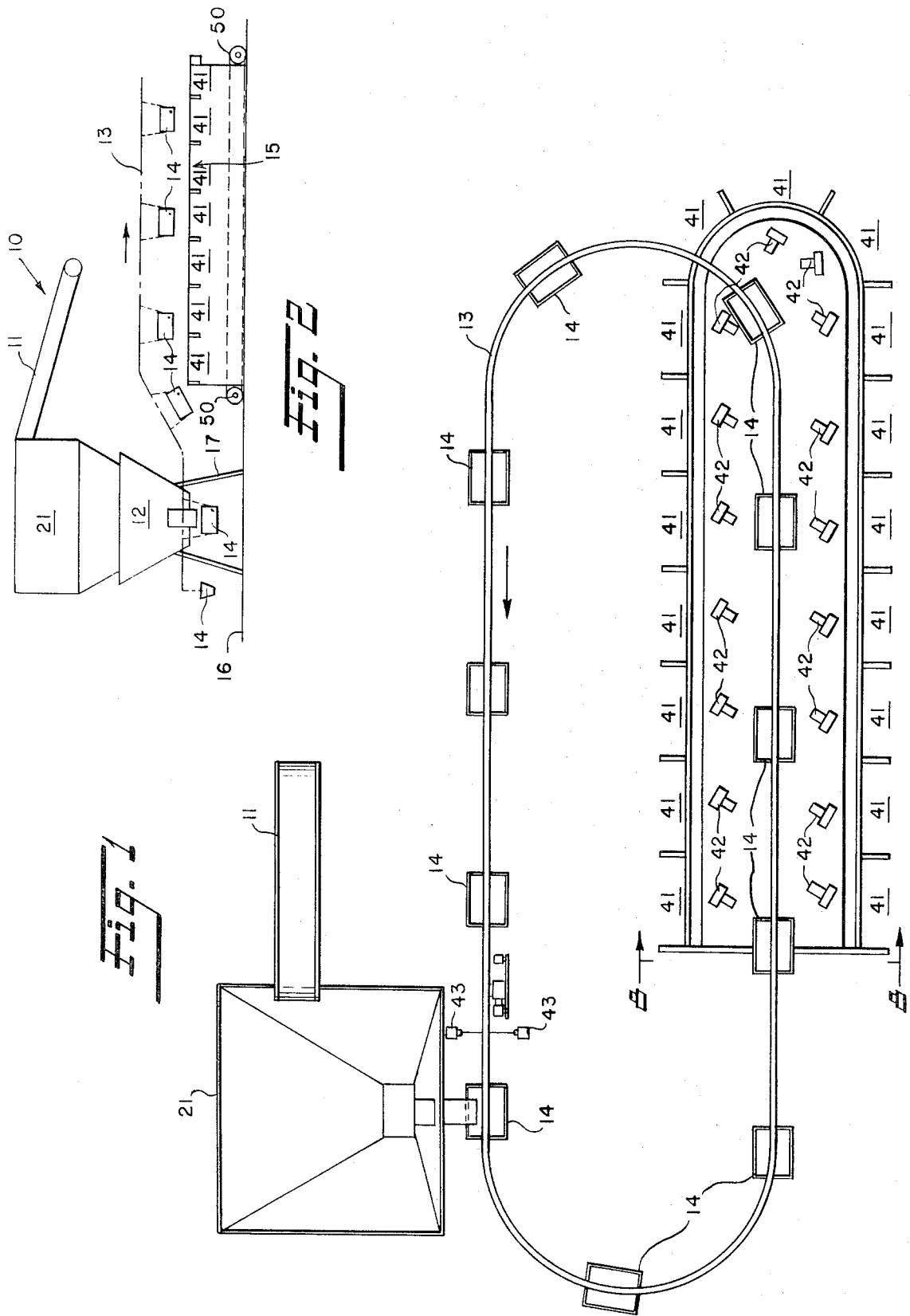

PATENTED JAN 29 1974
3,788,448
SHEET 5 OF 5
Fig.6
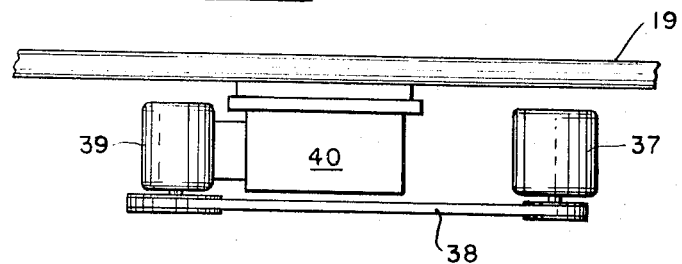
Fig.7
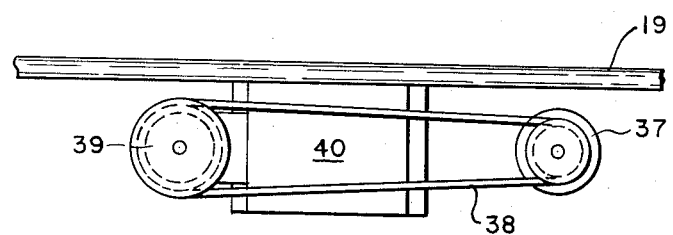
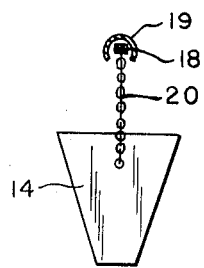
Fig.8
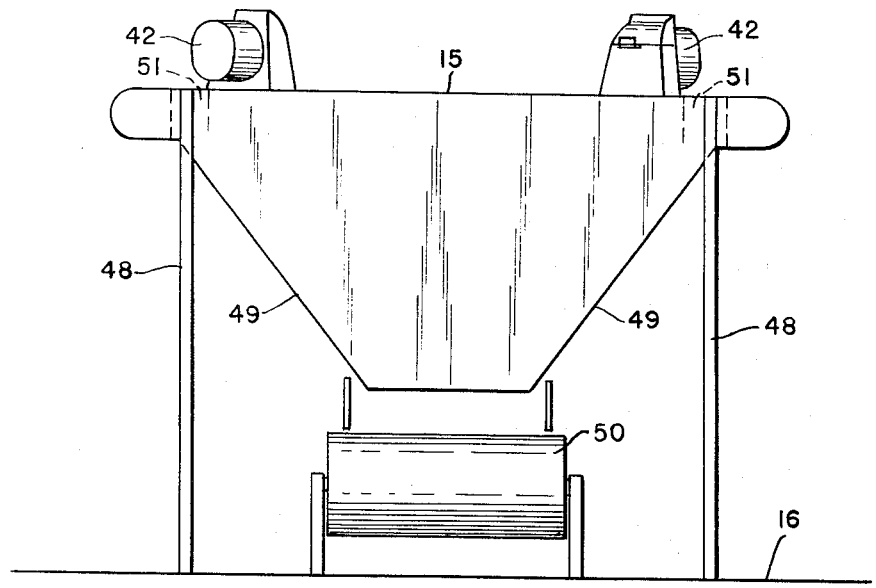

OYSTER HANDLING APPARATUS

BACKGROUND OF THE INVENTION

For a great number of years, the oyster industry was a flourishing enterprise notwithstanding the fact the same entailed considerable hard labor in the handling of the oysters from the time the same were deposited in a suitable warehouse and the time the same had been shucked and ready for consumption. In the past, the oysters deposited into a suitable storage area had to be handled, usually by manual labor using a shovel and basket or other receptacle. Following the filling of the basket with the aforesaid equipment, the basket was then brought, in some manner, to the area where the oyster shuckers removed the oysters from the receptacle and then proceeded to shuck the same. Needless to say, the aforesaid manual operations were quite time-consuming and also consisted of hard manual labor in bringing the oysters to the shuckers. No doubt the hard manual labor heretofore occasioned in the handling of the oysters has led to a scarcity of labor willing to continue in the oyster trade with the result that at present, this industry is in dire need of some improvements and refinements in the manner of handling the oysters if this industry is to continue to thrive as it has in the past. As is the custom, an oyster shucker is rewarded for his labors by the amount of oysters he or she shucks within a given period of time. As can be seen, if the shucker is not constantly supplied with oysters to be shucked, there is a waste of time on his or her part while awaiting a fresh supply of oysters and this delay or waste of time is costly to the shucker.

Feeling a need for certain improvements to be made in this industry so as to encourage the stay in the industry of those already enlisted therein and to promote interest in those people who could be lured into this area of employment, I have confined my efforts to alleviating the shortage of labor in this industry and with this in mind, it is the primary object of the invention to provide a mechanized means whereby the heretofore hard manual labor experienced by the laborer in bringing the oysters to the shucker has been reduced to a minimum.

Another object of the invention is to provide a means whereby a supply of oysters is always available to the shucker thus obviating any loss of time to the shucker should oysters not be made available to him.

Another object of the invention is to provide a means whereby, as the buckets or receptacles traverse a light-responsive device, an empty bucket is detected thereby and as the empty bucket proceeds in its travel with the conveyor, suitable switching mechanisms are actuated to cause a given amount of oysters to be deposited into the bucket and to then proceed to the area where the shuckers are stationed.

Another object of the invention is to form a flexible or false bottom at the bottom discharge end of a hopper so that when oysters from within the hopper are to be delivered to a bucket positioned therebelow, a vibratory motion is imparted to the false bottom so as to shake the oysters and cause their descent into the bucket.

Another object of the invention is to provide a hydraulic or penumatic means working in conjunction with an electric sensing device whereby when an empty bucket passes said sensing device, the hydraulic or pneumatic control means will be activated so that when the empty bucket is positioned under the discharge chute of a supply hopper, a gate will be caused to swing to open position and to thereby permit for the flow of oysters into the empty bucket.

Another object of the invention is to provide a pair of aligned openings in the lower wall portion of a bucket which will operate in conjunction with an electric eye sensing means which will energize certain controls of the apparatus when an empty bucket passes through the sensing means so as to permit for the filling thereof and to permit a previously filled or unemptied bucket to pass through the sensing means without affecting the controls of the apparatus thus causing said filled bucket to pass past the discharge chute of the hopper without receiving any additional oysters.

Still further objects together with the entire scope of applicability of the present invention will become apparent from the detailed description given hereinafter; it should be understood, however, that the detailed description is given by way of illustration only, since various changes or modifications within the scope of the invention will become apparent to those skilled in the art from this detailed description.

BRIEF DESCRIPTION OF THE DRAWINGS

FIG. 1 is a side view of the apparatus of the present invention.

FIG. 2 is a top plan view showing in enlarged form the apparatus of FIG. 1.

FIG. 6 is a top view with parts broken away showing the driving mechanism for the endless conveyor.

FIG. 7 is a side view of the driving means shown in FIG. 6 of the drawings, and

FIG. 8 is a view taken on lines 8—8 of FIG. 2, looking in the direction of the arrows.

DESCRIPTION OF THE PREPARED EMBODIMENTS

Figure 3:
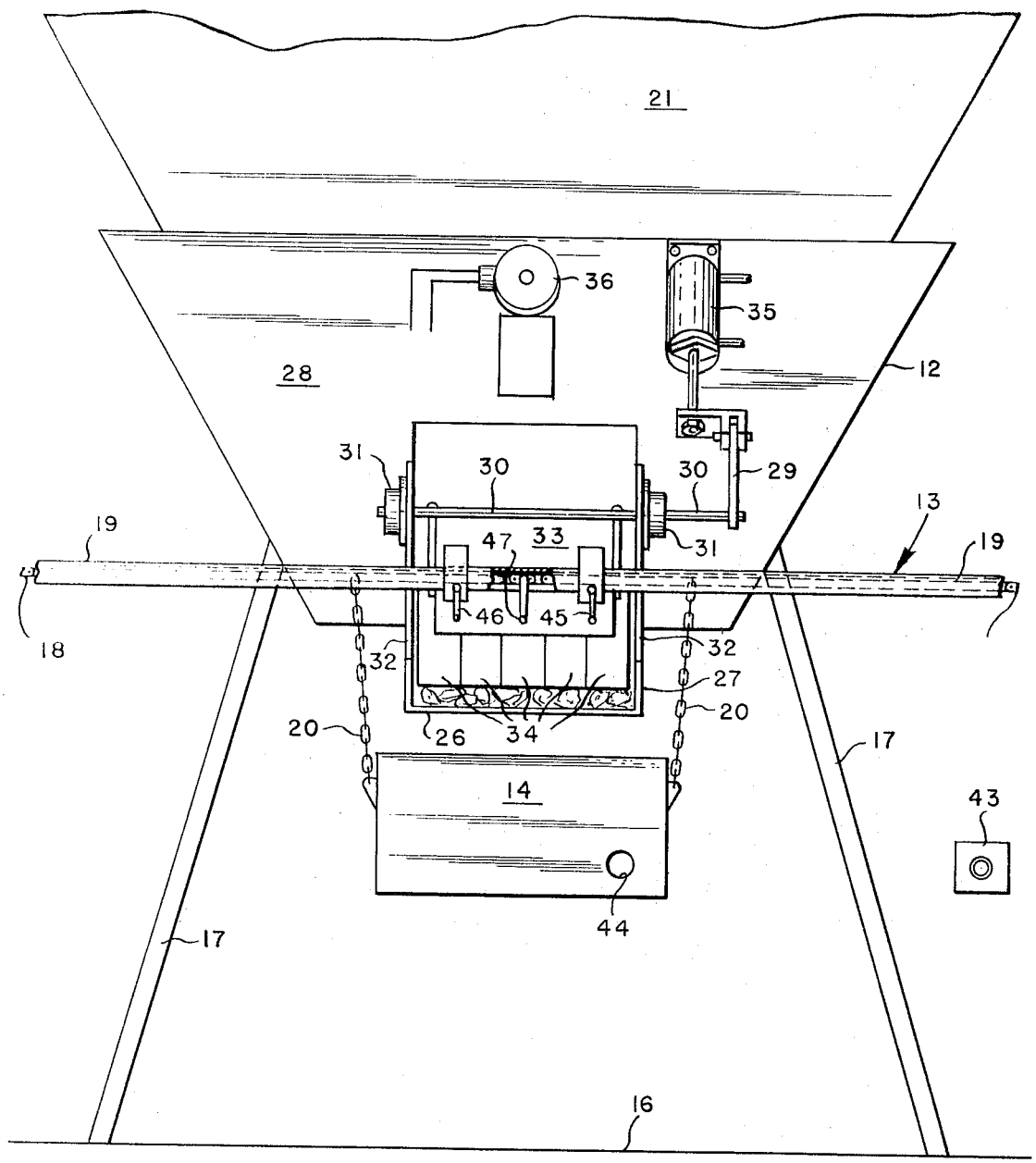
FIG. 3 is an enlarged view showing the front or discharge end of a hopper with parts broken away.

Referring now to FIG. 1 of the drawings, there is shown therein at 10 a complete assembly of the apparatus of my invention. The apparatus includes the combination of an endless conveyor 11 for delivering oysters to a hopper 12, an endless conveyor 13, buckets 14 suspended therefrom and a work table 15 constructed of any suitable material although, for sanitary reasons, the table 16 is preferably covered with a sheet of stainless steel.

The hopper 12 is constructed of any suitable material, such as cast iron, steel, and the like and the same is supported above a floor area 16 by means of suitable standards 17 secured in any known manner to the aforesaid flooring and to the sides of the hopper 12. The conveyor 13 is of conventional construction and comprises a sprocket-type chain 18 which is partially covered by a hood 19. The conveyor is suspended in any known manner from suitable suspending means extending from the roof of the enclosure wherein the apparatus is installed. As shown more clearly in FIG. 2 of the drawings, the endless conveyor is caused to travel in a closed path and the buckets 14 are attached thereto for travel therewith by means of chains 20. As shown in FIG. 7 of the drawings, the chains 20 are secured to the buckets 14 and the endless conveyor 13 in any known manner.

The hopper 12 is constructed as aforesaid and has positioned thereabove and attached or secured thereto in any known manner a bin 21. This arrangement is provided in case service has to be performed on the hopper 12. Since hopper 12 and parts associated therewith will be subjected to extreme wear, this arrangement has been found most desirable since if service has to be performed on the hopper 12 only, this part of the apparatus can be removed from the entire apparatus for servicing. The hopper 12, as more clearly shown in FIG. 4 of the drawings, is provided with a floor area designated at 22 and the same is preferably constructed of a flexible sheet steel which is supported within the confines of the lower end of the hopper in any known manner. Associated with the said floor 22 is an eccentrically mounted rotor 23 mounted for rotation on a suitable shaft, deriving its rotational force from a motor 24 connected thereto for driving the same through a suitable belt means 25.

The bin 21 is adapted to receive the materials directed into the hopper 12 from the conveyor 11 which receives the materials, in this instance oysters, from a storage area wherein the apparatus is installed. The conveyor is driven by any suitable means and the same is adapted to be loaded as by a wheeled vehicle having a scoop at the forward end thereof.

Figure 4:
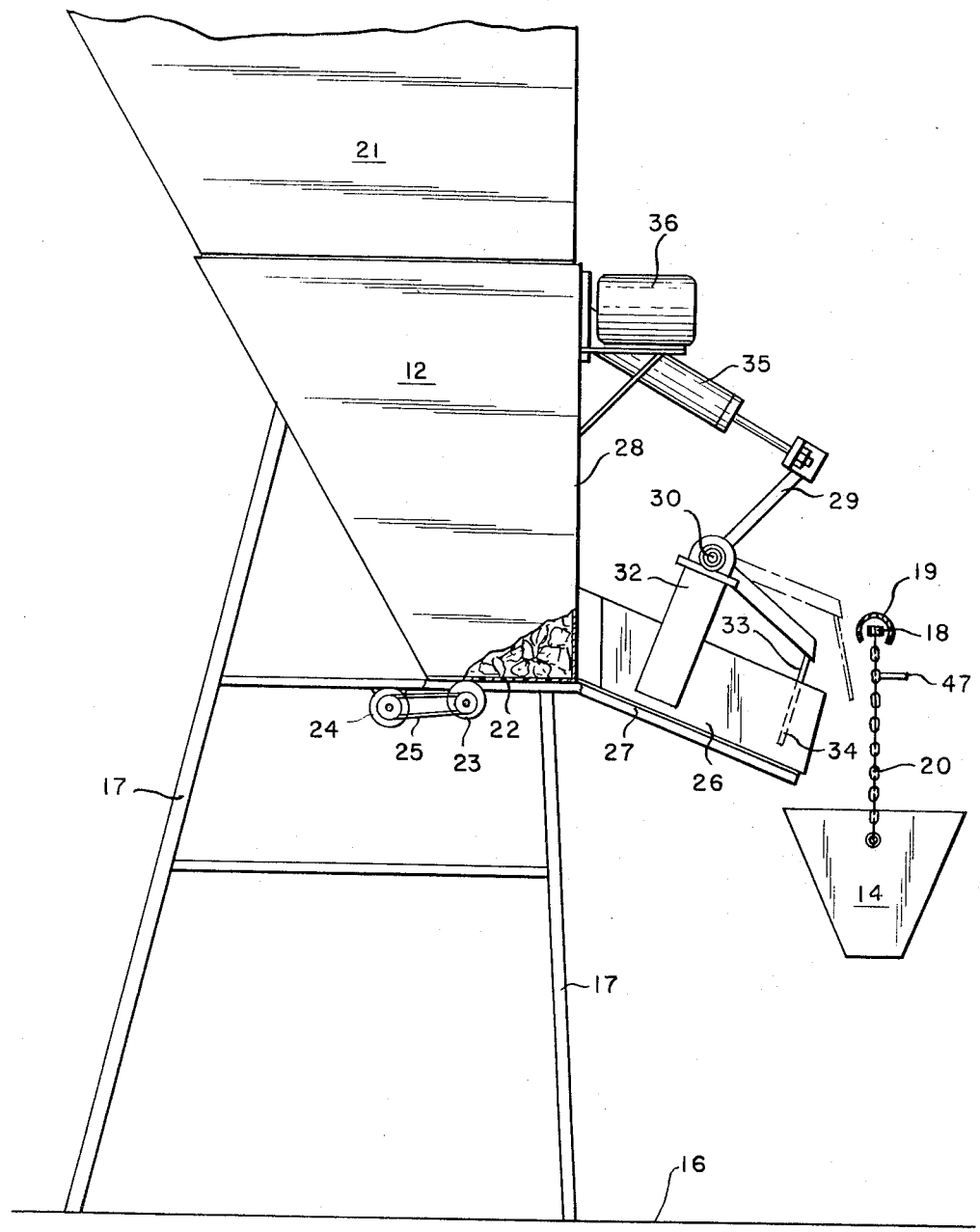
FIG. 4 is a side view of the hopper shown in FIG. 3 of the drawings.
Figure 5:
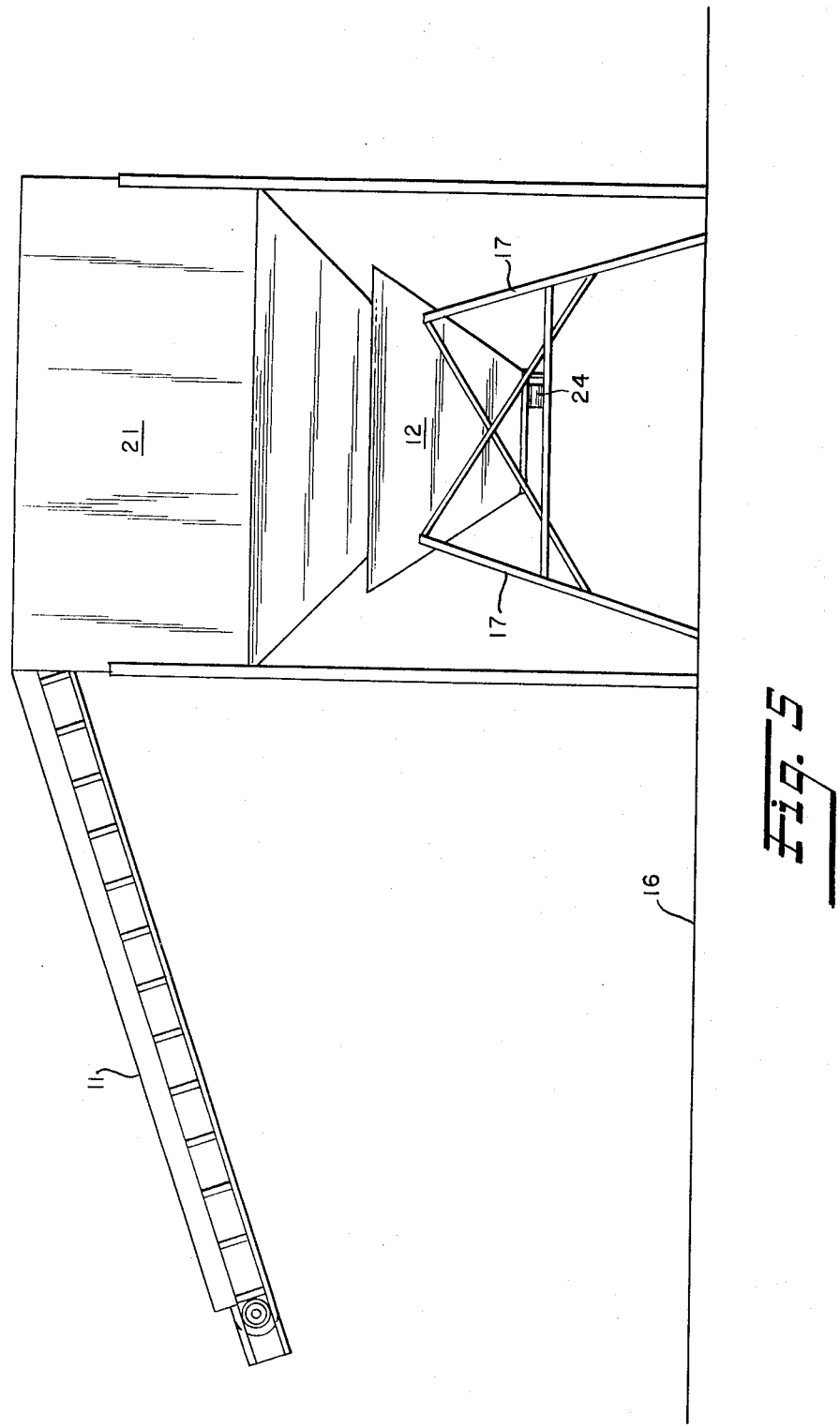
FIG. 5 is a view showing the back of the hopper and conveyor associated therewith.

As shown more clearly in FIGS. 3 and 4 of the drawings, the hopper 12 is provided along one wall thereof with a discharge chute 26 which is in the nature of an inclined surface 27 which is integral with or otherwise suitably secured to the hopper wall 28. The chute 26 extends outwardly of the wall 28 and affixed thereto in any manner is a bell crank assembly comprising an arm 29, shaft 30 extending throughout the width of the chute 26 and bearings 31 for the aforementioned shaft 30. A pair of plates 32 extend along each side of the chute 26 and are secured thereto in any known manner as by welding or the like. Mounted for movement from a closed to an open position is a pivoted gate 33 which is connected in any known manner to shaft 30 to act in concert therewith to effect either an opening or closing of the gate 33, in a manner to be more fully described hereinafter. In order to minimize damage to the oysters in the chute 26 during the closing thereof, a plurality of flexible strips 34 are secured in any known manner to the lower portion of the gate 33. Thus, when the gate is returned from its open to its closed position, after releasing a number of oysters from the chute into the bucket therebelow, the flexible strips will serve as a sufficient barrier for the further deposit of any more oysters in the bucket and by reason of its flexibility, little damage will be inflicted on the oysters retained in the chute.

In certain instances it may be desirable to use a vibratory motor 36 having mounted thereon a conventional vibration-imparting device to impart a vibration effect to the hopper 12 in order to insure a constant flow of oysters to the discharge chute area of the hopper 12. The motor 36 and vibration-imparting means associated therewith may be mounted on wall 28 of the hopper 12 in any known manner.

The drive for the endless conveyor 13 is derived from a motor 37, a belt connection 38 and pulley 39. A gear reduction unit designated generally at 40 operates to drive the conveyor at the desired speed. A suitable driving connection extends from the gear reduction unit to the chain 18 to effect a drive therefor.

Shown in FIG. 8 of the drawings, is a worktable 15 usually employed by the shuckers for the shucking operation. Such table, as shown more clearly in FIGS. 1, 2 and 8 of the drawings, comprises a generally rectangularly shaped work area with positions for the shuckers designated generally as at 41. Each area 41 is provided with a mechanized means shown generally at 42 whereby the shucker has at his or her disposal a means for chipping off the edge portion of the oyster whereupon the same may be more readily opened without first manually chipping the edge of the oyster as has been customary in the past.

To detect an empty basket or bucket as the same travels along the closed path, aforesaid, an electric eye 43 is positioned on opposite sides of the conveyor system as shown more clearly in FIGS. 2 and 3 of the drawings. The buckets 14 are each provided with a pair of aligned openings 44 formed in the lower wall portion thereof.

Stationarily mounted on the hood portion 19 of the conveyor system are a pair of switching arms 45 and 46. These arms are in electrical connection with a suitable source of power to cause the apparatus to operate in a manner to be described more fully hereinafter. For each of the buckets 14, a switch contact member 47 is mounted in any manner on the chain 18 and to travel with the conveyor 13 and will function in a manner to be described more fully hereinafter.

Referring now to FIG. 8 of the drawings, there is shown therein a worktable with the mechanical chippers 42 mounted thereon and secured thereto in any suitable manner. The mechanized means form the subject of an application for patent thereon which has been filed by this inventor. The table 15 shown in this figure of the drawings is supported on the flooring 16 by means of suitable standards 48 which are secured in any known manner to these components. The table 15 preferably comprises a flat surface with side walls 49 thereof diverging downwardly to an open bottom which overlies an endless conveyor 50 which is driven by a suitable source of motive power (not shown) to direct the empty shells of the oyster to an area outside of the structure wherein this apparatus is installed. A slot 51 is provided adjacent the edges of the worktable 15 wherein the shucker can deposit the empty shells of the oysters and the same will be delivered onto the aforesaid endless conveyor 50 for removal from within the confines of the enclosure for the aforesaid apparatus.

Having described the various components of the invention I will now describe the mode of operation thereof:

Referring now more particularly to FIGS. 1 and 2 of the drawings, all of the components of the apparatus are designed more suitably to be housed within the same enclosure and under roof so as to protect the same from the elements. For that matter, the oysters to be handled by the aforesaid apparatus are likewise held in storage within the aforesaid enclosure.

The oysters to be handled by the aforesaid apparatus are preferably loaded on to the conveyor 11 by means of a wheeled vehicle such as a tractor loader having a loading bucket associated therewith. The oysters having been deposited on to the conveyor 11 and the motive power for the conveyor 11 turned to the on position, the oysters will travel therewith and be deposited into the hopper 12 via the bin 21. It should be pointed out that the bin 21 provides for a reserve supply of oysters to be fed into the hopper 12 to thus always insure a constant supply of oysters therein.

Thus, with the bin 21 and hopper 12 filled with oysters, in the manner aforesaid, and with the motor 37 for the endless conveyor 13 turned to the on position, the conveyor and buckets suspended therefrom are caused to travel in the direction of the arrow shown in FIG. 2 of the drawings. As the buckets pass the electric sensing device, in this instance a photoelectric eye arrangement, the passage of the light through the aligned openings 44 provided in the lower portion of each of the buckets will, through suitable electrical circuitry, activate switch arm 45 and when the same is contacted by switch arm 47 carried by the conveyor 13, vibration-imparting motors 24 and 36 are turned to their on position whereupon the hopper and floor thereof are subjected to vibratory forces to loosen the oysters and to cause their descent into the bucket positioned below the chute 26. Following contact of traveling switch arm 47 with the stationary contact arm 45 and with the conveyor 13 still advancing in its line of travel in the direction previously described, the electrical circuitry between the switch arm 54 and travelling arm 47 will effect a start of the means supplying a hydraulic or pneumatic medium to the motor 35 so as to initiate the opening of the gate 33. With the opening of the gate 33 in the manner aforesaid and with the bucket still travelling along with the conveyor, oysters will be deposited into the bucket and by this time the bucket will have traveled to a position where the movable contact arm will come in contact with the stationary switch arm 46, the bucket will have been filled and the electrical circuitry between the said stationary switch arm and the travelling arm 47 will effect a reveral of the flow of the medium to the motor 35 to thereupon initiate the closing of the gate.

Following the filling of the bucket, as aforesaid, and with the gate returned to its closed position, in the manner aforesaid, the contact of movable contact 47 with stationary contact 46 will also cause the vibrating motors to be turned off. A suitable electrical circuitry between the said contacts 47 and 46 and the vibrating motors is provided to effect the stopping of the aforesaid motors. The sequence of operation will continue for each empty bucket passing through the photoelectric sensing means. The filled bucket continues on its travel from the filling chute 26 and on to a position over the worktable 15 whereupon a shucker in need of a fresh supply of oysters will dump the bucket at his work station and continue his shucking operation without interruption.

In the event a previously filled bucket has not been emptied by one of the shuckers at one of the work stations and the same is returned to the hopper in a still-filled condition, the light emanating from the photoelectric sensing means will be barred from passing from one of the aligned openings 44 to the other and all of the controls for starting the vibration-imparting motors as well as the switching mechanism for effecting an opening of the gate 33 will remain inactivated and the filled bucket will continue on its previously defined path of travel without admission thereinto of any more oysters.

The above defines an apparatus and mode of operation which is considered to be a great advancement in the oyster industry, as, heretofore, having oysters available at all times to the shucker entailed considerable manual labor and oftentimes resulted in the loss of earnings by a shucker due to a non-supply thereof available to him at his work station.

In the foregoing specification I have illustrated and described certain presently preferred embodiments of my invention; it will be understood, however, that this invention may be otherwise embodied within the scope of the following claims.

I claim:

1. An apparatus for continuously delivering shell seafood to a work table having work stations positioned about said work table, comprising, supply container for said shell seafood, a discharge chute extending from said container, spaced stationary electric contact members mounted adjacent said discharge chute, a gate pivotally mounted in said chute, power means to effect an opening and closing of said gate, an endless conveyor traveling over said work table, a plurality of receptacles suspended from said endless conveyor, electric contact members, one for each of said receptacle mounted on said conveyor for travel therewith, vibratory motors for said supply container, a pair of aligned openings formed in the walls of said receptacle, an electrical sensing unit in the path of travel of said conveyor, said sensing unit responsive of the absence of shell seafood within said receptacles, whereupon one of said movable contact on said conveyor will engage with one of said stationary contact adjacent said discharge chute to actuate the power means for said gate to open the same and to actuate the vibratory motors to permit the delivery of shell seafood to said receptacle and upon continued travel of said conveyor said movable contact thereon will engage with the other of said stationary contact to cause said power means to close said gate and simultaneously stop the motors imparting a vibratory motion to said container.

2. The apparatus recited in claim 1 wherein said sensing means composes a photo-electric means disposed on opposite sides of the line of travel of said conveyor and receptacles having the aligned openings formed in the walls thereof.

3. The apparatus recited in claim 1 wherein said supply container is provided with a flexible floor and one of said vibratory motors imparts a vibratory motion to said flexible floor.

4. The apparatus recited in claim 1 wherein flexible members are provided on the gate means positioned within said chute.

5. The apparatus recited in claim 1 wherein upon the passage of an already filled receptacle through the sensing field of said sensing unit will permit for the passage of said already filled receptacle past the said discharge chute without the deposit therein of any additional shell sea food.

* * * * *